United States Patent
Hyllberg

Patent Number: 5,609,553
Date of Patent: Mar. 11, 1997

[54] CERAMIC ROLLER FOR ESA PRINTING AND COATING

[75] Inventor: Bruce E. Hyllberg, Gurnee, Ill.

[73] Assignee: American Roller Company, Union Grove, Wis.

[21] Appl. No.: 237,485

[22] Filed: May 3, 1994

Related U.S. Application Data

[63] Continuation-in-part of Ser. No. 973,447, Nov. 9, 1992, and a continuation-in-part of Ser. No. 171,884, Dec. 21, 1993, which is a continuation of Ser. No. 3,156, Jan. 12, 1993, abandoned.

[51] Int. Cl.⁶ .................................................. B23P 15/00
[52] U.S. Cl. .................... 492/53; 492/46; 29/895.32; 427/453; 399/286
[58] Field of Search ................ 492/50, 52, 54, 492/56, 46; 29/895.32, 611, 620; 355/285, 219; 427/446, 448, 453, 454

[56] References Cited

U.S. PATENT DOCUMENTS

| | | |
|---|---|---|
| 3,335,026 | 8/1967 | DeGeest et al. . |
| 3,462,286 | 8/1969 | DeGeest et al. . |
| 3,979,948 | 9/1976 | George et al. . |
| 4,127,327 | 11/1978 | Rezanka . |
| 4,457,256 | 7/1984 | Kisler et al. . |
| 4,489,672 | 12/1984 | Kisler . |
| 4,493,256 | 1/1985 | Hyllberg et al. . |
| 4,628,183 | 12/1986 | Satomura ................................ 219/216 |
| 4,637,109 | 1/1987 | Bryer . |
| 4,813,372 | 3/1989 | Kogure et al. . |
| 4,835,004 | 5/1989 | Kawanishi . |
| 4,888,464 | 12/1989 | Shibata et al. ........................... 219/216 |
| 5,161,306 | 11/1992 | Nakahira et al. ......................... 492/50 |
| 5,322,970 | 6/1994 | Behe et al. ............................... 118/651 |
| 5,420,395 | 5/1995 | Hyllberg et al. ......................... 219/470 |

FOREIGN PATENT DOCUMENTS

| | | |
|---|---|---|
| 6109381 | 8/1981 | Japan . |
| 2061493 | 3/1990 | Japan . |
| 666332 | 7/1988 | Switzerland . |

OTHER PUBLICATIONS

Plasma–sprayed Coatings –Author/Herbert Herman –from Scientific American/Sep., 1988.

*Primary Examiner*—Irene Cuda
*Attorney, Agent, or Firm*—Quarles & Brady

[57] ABSTRACT

An electrostatic assist roller (30) for use in a coating, printing or copying machine includes a cylindrical roller core (35), and a ceramic layer (38) formed by plasma spraying a blend of an insulating ceramic material and a semiconductive ceramic material in a ratio which is selected to control the resistance and thickness of the ceramic layer in response to an applied voltage differential. The semiconductive ceramic layer (38) is sealed with a solid, low viscosity sealer (39), such as Carnauba wax, to protect the ceramic layer (38) from moisture penetration. A second ceramic layer (37) may be used to insulate the semiconductive ceramic layer (38) from the core (35).

10 Claims, 3 Drawing Sheets

CERAMIC ROLLER FOR ESA PRINTING AND COATING

CROSS-REFERENCE TO RELATED APPLICATIONS

This is a continuation-in-part of a copending U.S. patent application, of Hyllberg, Ser. No. 07/973,447, filed Nov. 9, 1992; and a continuation-in-part of a copending U.S. patent application of Hyllberg, Ser. No. 08/171,884, filed Dec. 21, 1993, which is a continuation of U.S. patent application Ser. No. 08/003,156, filed Jan. 12, 1993 and now abandoned.

TECHNICAL FIELD

The invention relates to rollers for use in electrostatic assist (ESA) printing and coating machines.

BACKGROUND ART

Referring to FIG. 1, in an ESA printing machines, ink is transferred from an engraved printing cylinder 10 to an underside of a web 11 of non-conducting material aided by electrostatic attraction. A roller 12 positioned above the web 11 provides the electrostatic attraction of the ink to the web 11. In some applications, this roller 12 is referred to as an impression roller because it forms a nip 14 with the printing cylinder 10 and contacts the web 11. The impression roller usually has a resilient outer covering of synthetic rubber of 60 to 95 Shore A durometer hardness that bears against the web 11 and the printing cylinder 10. The engraved printing cylinder 10 may rotate through a reservoir 16 holding ink or coating material, the thickness of which is controlled by doctor blade 17.

In other applications, the ESA roller is spaced from the web in a machine known as a gap coating machine, also known as a meniscus or bead coating machine. In this machine the web is in contact with the impression roller but not the engraved cylinder. The engraved cylinder meters the coating to the nip region where there is a very small, but precise gap or air space. Such machines can use a chrome-plated copper, a laser engraved ceramic cylinder or a smooth chrome-plated cylinder with a doctor blade that controls the coating material on the cylinder.

Voltage is applied to the ESA roller either through a slip ring arrangement or through a third roller in the machine known as the voltage applicator roller 18 as seen in FIG. 1. ESA rollers normally have at least two layers, an insulating base material 19 on the metal core 20 to prevent leakage to ground, and a semiconductive synthetic rubber material 21. If the roller core can be insulated from ground, only a semiconductive rubber layer is needed 21. A typical ESA printing machine, including an impression roller, is described and shown in Adamson, U.S. Pat. No. 3,477,369 and Hyllberg et al., U.S. Pat. No. 4,493,256, issued Jan. 15, 1985.

Technical problems in ESA rollers are mechanical wear, chemical deterioration, and heating at higher speeds of press operation. Heating can cause greater aging of the rubber layer typically used as the outer layer in impression rollers. When ESA rollers with rubber covering become worn, their diameter changes, which may affect printing operations. Eventually, wear on the outer covering will require replacement or recovering of the roller.

Recently, in Hyllberg, U.S. patent application, Ser. No. 07/973,447, filed Nov. 9, 1992, which is referred to above, there was disclosure of ceramic materials for a charging roller for a copying machine. A difference there is that the charge donor roller more often has a voltage applied directly to its core and does not need to be grounded. In comparison, an ESA roller is preferably insulated from the rest of the machine and has a voltage applied from another roller.

An advantage of ceramic for ESA applications is that ceramic may be formed in thinner layers than semiconductive rubber. A ceramic layer maintains its operating dimensions over substantial use. The present ESA application is a coating operation in which a coating must be applied in a uniform thin layer of liquid coating on a web.

A further problem in the art is vibration of the ESA roller at higher machine speeds. In Carlson, U.S. Pat. No. 5,256,459, issued Oct. 26, 1993, a fiber-reinforced composite tube is disclosed for roller applications. Such a core exhibits good dampening characteristics at higher speeds of rotation. Such a tube, however, has not been known to be combined in a roller with ceramic layers, due to difficulties in bonding the two materials.

The present invention is intended to overcome the limitations of the prior art by providing methods and constructions of ceramic ESA rollers for both coating and printing applications.

DISCLOSURE OF THE INVENTION

The invention relates to a ceramic roller with superior mechanical and electrical properties for electrostatic applications.

The surface layer is a blend of at least two materials, one of which is an electrical insulator, and the other of which is a semiconductor.

In a specific embodiment, the ESA roller comprises a cylindrical roller core, and a ceramic layer which is bonded to the cylindrical roller core. The ceramic layer is formed as a blend of an insulating ceramic material and a semiconductive material, in which the blending ratio is selected to control the electrical resistance of the ceramic layer to an applied voltage differential.

The ceramic materials are blended in a ratio selected to produce an electrical resistance in the range of a semiconductor.

A specific insulating material can be either alumina or zirconia applied by plasma or thermal spraying, and a specific semiconductive ceramic material can be either titanium dioxide or chrome oxide applied by plasma or thermal spraying.

The invention can be embodied in a roller with one semiconductive ceramic layer, or with a semiconductive ceramic layer and a insulating ceramic layer, or with a semiconductive ceramic layer and a insulating ceramic layer and a relatively more conductive layer disposed between the other two layers.

The invention also relates to a method of making an electrostatically chargeable roller usable in a machine for coating, printing or copying, the method including the steps of applying a bond coating to a tubular core of fiber-reinforced material; plasma spraying a blend of an insulating ceramic material and a semiconductive ceramic material to form a ceramic layer which is bonded by the bond coat to the roller core, with the ceramic layer having a selected resistance to produce an electrostatic attraction in response an applied voltage differential; and sealing the ceramic layer with a seal coat.

The volume resistivity of the semiconductive layer of a rubber-covered ESA roller is in the range of $10^7$ to $10^8$ ohm-cm and its thickness is about one-half inch. In contrast, a ceramic semiconductive layer has a volume resistivity of approximately $5\times10^9$ ohm-cm and can be on the order of 10 mils thick.

The use of ceramic layers for also advantageous is reconditioning rollers by replacing their outer semiconductive rubber layers with ceramic layers. Ceramic layers are more durable than rubber layers. In this discussion, rubber includes both natural and synthetic rubbers.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

BEST MODE FOR CARRYING OUT THE INVENTION

Figure 2:
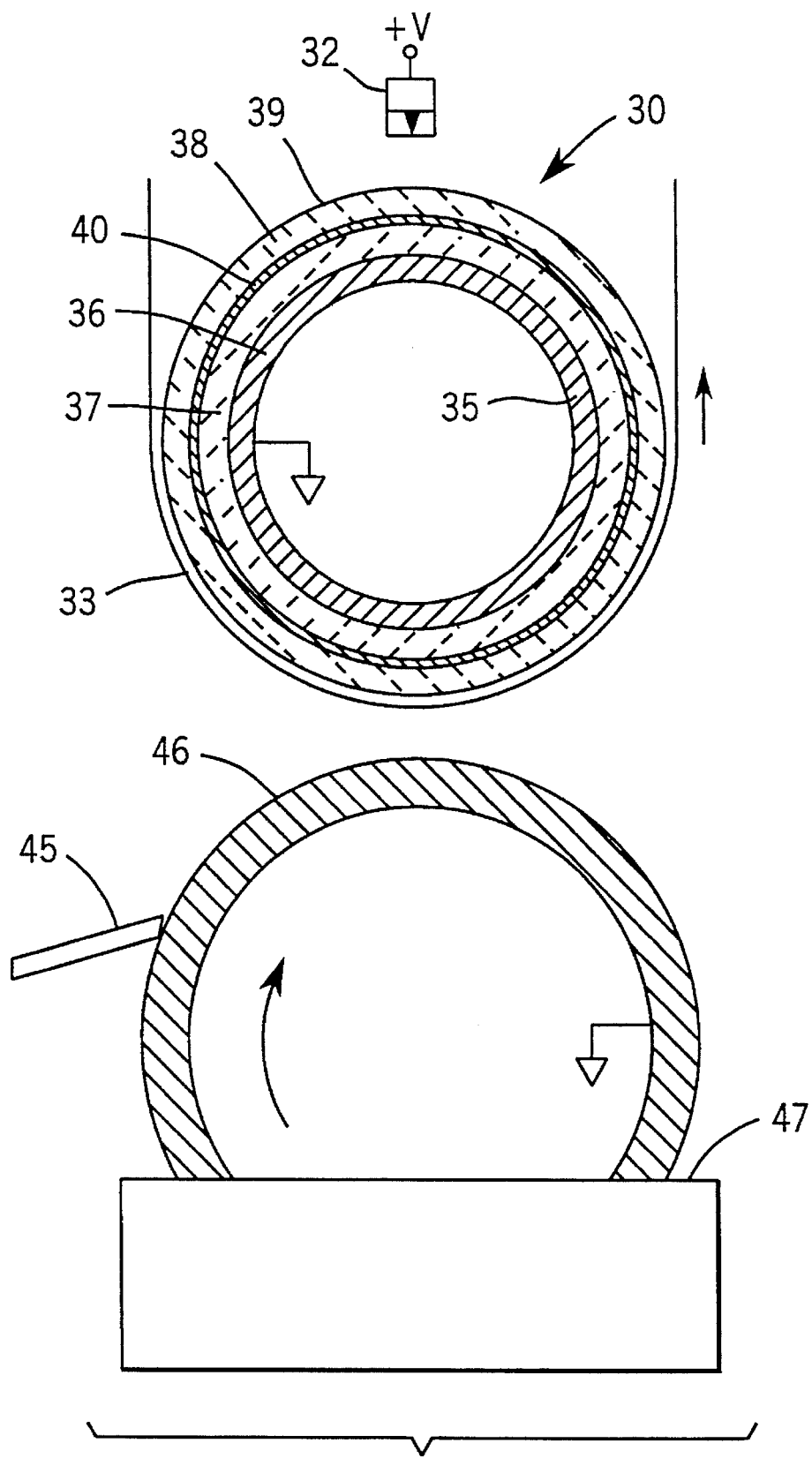
FIG. 2 is a transverse sectional view of a coating machine incorporating a first embodiment of an ESA roller of the present invention.
Figure 3:
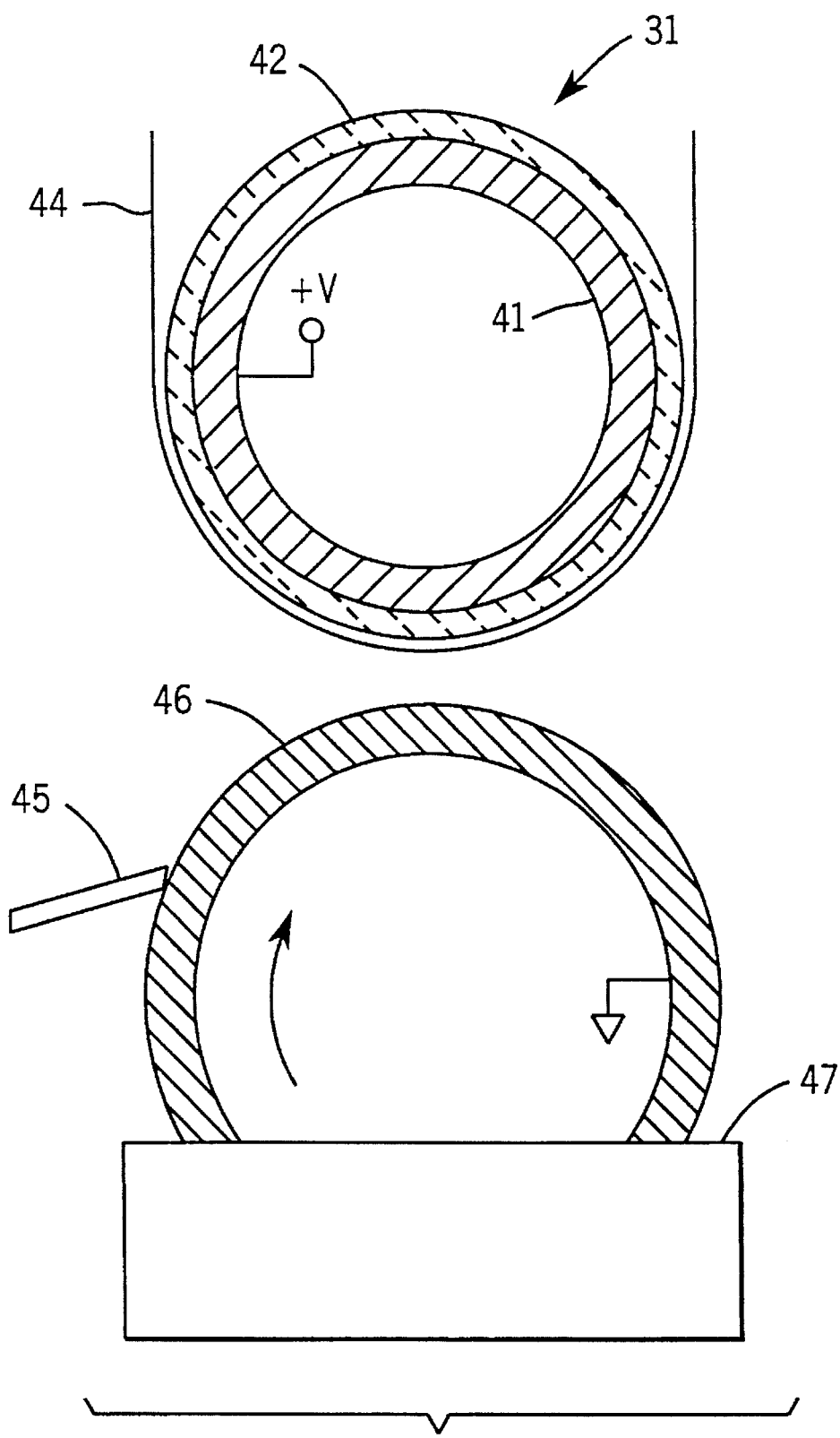
FIG. 3 is a transverse sectional view of a coating machine incorporating a second embodiment of the present invention.

Referring to FIGS. 2 and 3, the invention is incorporated in an electrostatic assist (ESA) roller 30, 31 and a method for making the same. FIG. 2 shows such a roller 30 in an ESA coating machine where an electric voltage is applied to the ESA roller 30 through a non-contact charging bar 32 at a potential of 25,000 volts DC. A web 33 of material is fed vertically downward and around a bottom of the ESA roller 30 and is then fed vertically upward. A coating liquid is transferred from a reservoir 47 by coating cylinder 46 to an underside of the web 33 aided by electrostatic attraction provided by ESA roller 30. The web 33 is formed of a non-conducting material. The thickness of the liquid on the coating cylinder is controlled by doctor blade 45. Although the coating cylinder 46 is shown rotating in a clockwise direction in FIGS. 2 and 3, it can also be rotated in a counterclockwise direction with the doctor blade 45 positioned on the right side as would be seen in the drawings.

As seen in FIG. 2, a preferred embodiment of the ESA roller 30 has a tubular core 35. The tubular core 35 is formed of a fiber-reinforced composite (FRP) type material as described in Carlson, U.S. Pat. No. 5,256,459, issued Oct. 26, 1993. An alloy bonding layer 36 of three to five mils thickness (1 mil=0.001 inches) and having a surface roughness from 300 to 500 microinches $R_a$ is formed over the full outer surface of the tubular core 35. An insulating ceramic material 37 is then applied over the bonding layer 36.

A semiconductive ceramic layer 38 of ten to fifteen mils thickness is applied over the full outer surface of the ceramic insulating layer 37, except for the last inch on each end of the roller. This keeps coating away from the ends of the roller 30 and away from any mechanical supports or electrical connections to the roller 30.

A seal coat 39 is then applied to penetrate the surface of the ceramic layer 38, and the roller 30 is cured.

The ESA roller 30 is more particularly made as follows:

Step 1. A tubular FRP core 35 is formed using the methods disclosed in Carlson, U.S. Pat. No. 5,256,459, cited above. For this application, the core 35 has a wall thickness of one-half inch or more to limit deflection to no more than 0.001 inches.

Step 2. Apply a bonding layer 36 from three mil to five mils thickness of a material such as Metco AE 7203, also known as Metco 900, which is 12% silicon, 25% plasticizer and 63% aluminum.

Step 3. Apply an insulating ceramic layer 37 by plasma spraying a 95% alumina powder ceramic material, such as Metco 101 or Norton 110. This layer can be 20 to 100 mils thick, and in this example is 60 mils thick.

Step 4. Apply a ceramic layer 38 of 10 mils to 15 mils thickness with plasma spraying techniques and equipment using a blend of alumina and titania, such as Metco 130 (87/13 alumina/titania) and Metco 131 (60/40 alumina/titania) in a 40/60 to 80/20 blend. Metco products are available from Metco Corp., Westbury, N.Y. Alternatives for Metco 130 and 131 are Norton 106 and 108, respectively.

This step is further carried out by spraying thin uniform sublayers to arrive at a desired thickness of the ceramic layer 38. The thinnest practical layer of plasma sprayed ceramic for an electrical grade coating having high integrity and uniformity is about five mils.

As an option, a relatively more conductive layer 40 can be formed between layer 37 and layer 38. The resistance of this conductive layer should be at least twenty times lower than the surface of semiconductive layer 38 while the resistance of the insulating layer 37 should be at least twenty times higher than the semiconductive layer 38. A typical volume resistivity value for the relatively more conductive layer 40 is $5\times10^7$ ohm-cm or less. The material would be 100% titania. Nickel could also be used for this layer 40. The layer thickness would be on the order of 1 to 10 mils, and in this example would 2 mils.

As used herein, the term "insulating" material shall mean a material with a volume resistivity of $10^{10}$ ohm-centimeters or greater. Alumina and zirconia are examples of oxide ceramics that are insulating materials. These typically have volume resistivities of $10^{11}$ ohm-centimeters or greater.

As used herein, the term "semiconductive" material shall mean a material with a volume resistivity between $10^3$ ohm-centimeters and $10^{10}$ ohm-centimeters. Titanium dioxide ($TiO_2$) and chromium oxide are examples of semiconductive or lower resistance ceramics. These ceramics have volume resistivities typically of $10^8$ ohm-centimeters or lower. There are many other examples of materials in both categories that are commercially available. These relatively high and low resistance materials can be blended to achieve the proper balance of electrical properties for the charge transfer roller application.

It is noted that plasma spray ceramic powders are not pure materials. Even the purest alumina commercially available is only 99.0% to 99.5% pure. Many grades of alumina contain several percent by weight of other metal oxides. For example, white or gray alumina may contain titania (titanium dioxide) ($TiO_2$) in amounts from less than 5% up to at least 40%. An increase in the percentage of titania in the blend lowers the resistance of the material. Even though these materials are available as single powders, they are still blends of various ceramics. The electrical properties of the final ceramic layer are the sum of the individual contributions to resistance, capacitance, dielectric strength, etc. A single powder may be available that would exactly meet the electrical requirements for the charge transfer roller application. It would no doubt not be a pure material.

The preferred ceramics are Metco 130 (87/13 alumina/titania) and Metco 131 (60/40 alumina/titania) in a 40/60 to 80/20 blend. Metco products are available from Metco Corp., Westbury, N.Y. The electrical properties of the coating are determined in large part by the ratio of alumina to titania in the finished coating. These two materials are easy to blend since they can be purchased in the same particle size range and they have nearly the same density. A typical value of titania in resulting blend is 20 to 24 per cent.

For any ceramic layer containing titania (titanium dioxide), the resistance of the layer is also affected by the spraying conditions. Titania can be partially reduced to a suboxide by the presence of hydrogen or other reducing agents in the plasma flame. It is the suboxide (probably TiO rather than $TiO_2$) that is the semiconductor in the ceramic layer 38. Titanium dioxide is normally a dielectric material. The typical average chemical composition of titanium dioxide is 1.8 oxygen per molecule rather than 2.0 in a plasma sprayed coating. This level (and thus the coating properties) can be adjusted to some extent by raising or lowering the percent of hydrogen in the plasma flame. The normal primary gas is nitrogen or argon while the secondary gas is hydrogen or helium. The secondary gas raises the ionization potential of the mixture, thus increasing the power level at a given electrode current. For a typical Metco plasma gun, the hydrogen level is adjusted to maintain the electrode voltage in the gun between 74 and 80 volts.

The plasma spray parameters should be suitably adjusted to insure that the blend of materials in the finished ceramic layer 38 is the same as intended. All of the powders mentioned do not require the same power levels, spray distance, and other parameters. Thus, adjustment of spray distance, for example, may increase the deposit efficiency of one powder over the other and change the material blend in the finished coating.

Plasma sprayed ceramic coatings can be applied in one pass (layer) of the plasma gun or in multiple passes. The normal method for most types of coating applications is to apply multiple thin coatings of ceramic and build up to the required thickness. Although the ceramic layer described above has a uniform ceramic composition, the sublayers of ceramic in the resulting layer 38 do not have to have the same composition. The coating can be designed to have a different resistance at the surface than the average bulk of the material. This might be done 1) to change the way a charge is held at the surface of the roller without changing its bulk properties or 2) to compensate for the increased resistance of a topical coating.

Figure 1:
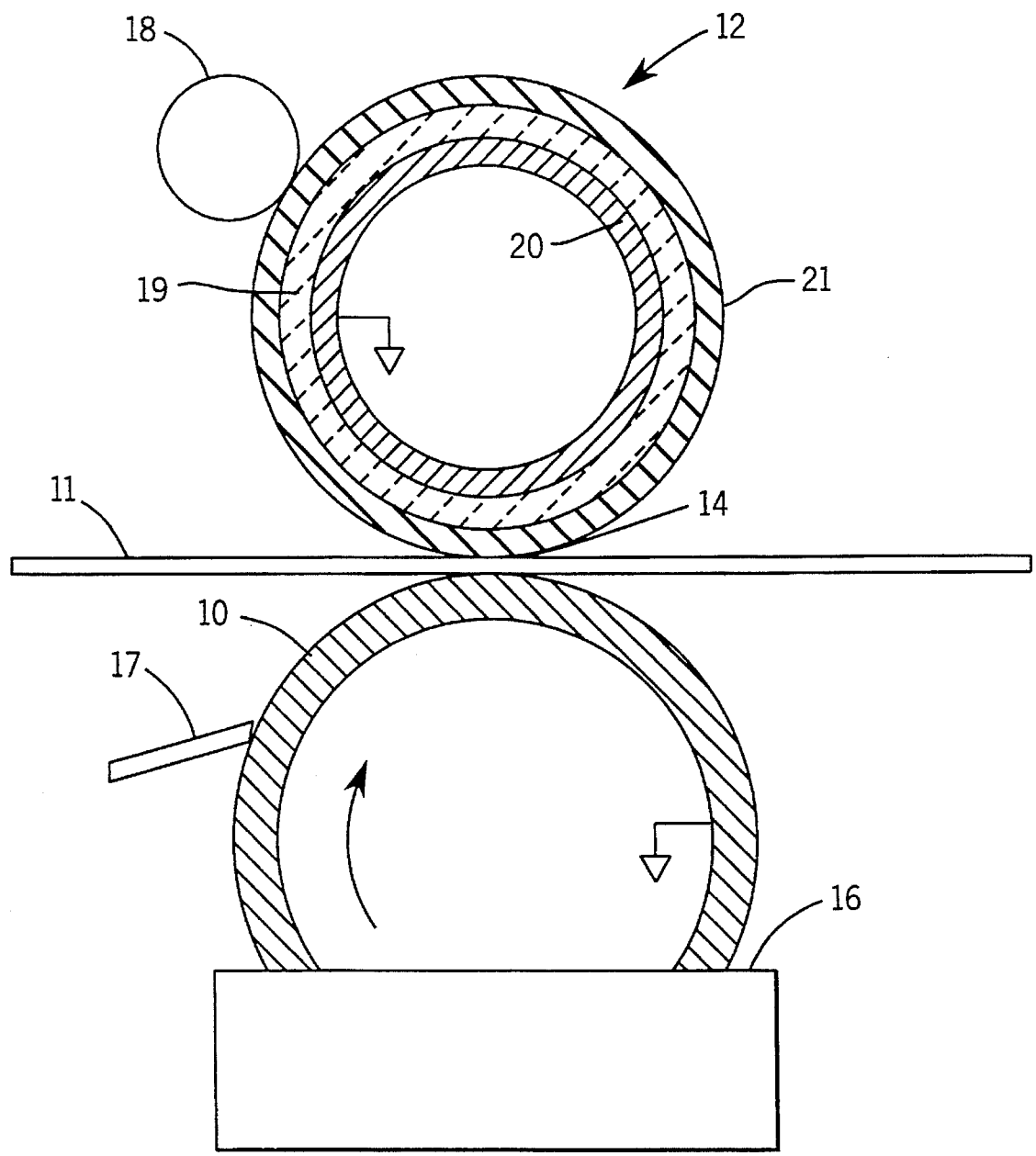
FIG. 1 is a transverse sectional view of a prior art ESA machine.

The resistance of the semiconductive layer is selected to be in the range from 100 k ohms to 1 Megohm to limit current in the roller. In an ESA roller, there is essentially no heating in the semiconductive layer and the roller operates at near its ambient temperature. When using a voltage application roller, such as element 18 in FIG. 1, a relatively high voltage, 500–5000 VDC is applied to produce a current of three milliamps, for example, for a total power dissipation of fifteen watts in the roller. When a 25 kilovolt charging bar 32 is used, the maximum voltage on the surface of the roller is about 7000 VDC for a two-layer or three-layer roller.

Step 5. While the roller 30 is still hot from the plasma or thermal spraying of the semiconductive ceramic layer 38, a seal coat 39 is applied to the ceramic layer 38 using a dielectric organic material such as Carnauba wax or Loctite 290 weld sealant. This sealant is allowed to soak in for several hours at room temperature. The sealant is cured, if necessary, (Loctite 290), with heat, ultra violet light, or spray-on accelerators. When curing the roller 30, lower heat must be used, 150° F. for example, to avoid adverse effects on the ceramic. The ceramic porosity level is generally less than 5% by weight (usually on the order of 2%). Once sealed, the porosity level has a minimal effect on the coating properties for this application.

The preferred types of materials are 100 percent solids and low viscosity. These include various kinds of waxes, low viscosity condensation cure silicone elastomers, and low viscosity epoxy, methacrylates, and other thermoset resins.

Liquid sealers such as silicone oil could be used alone, or liquids in solids, such as silicone oil in silicone elastomer. These may yield additional benefits to the ESA roller to provide some measure of release (non-stick properties).

The sealer will generally be a high resistance material, although the electrical properties of the sealer do affect the overall properties of the sealed ceramic layers 38. For example, sealing with Carnauba wax will result in a higher resistance of the sealed ceramic layer 38 than Loctite 290 weld sealant because it is a better dielectric material. It is also possible to use a semiconductive sealant with a dielectric ceramic (without any semiconductive ceramic) to achieve the desired electrical properties.

A low resistance sealer could be used, such as a liquid or waxy solid type of antistatic agent, as long as the combination of ceramics and sealer yielded the proper electrical properties in the completed ceramic layer 16.

Step 6. A final step is to grind and polish the sealed ceramic layer 38 to the proper dimensions and surface finish (diamond, silicon carbide abrasives, etc.). After finishing, the ceramic layer 38 is typically 10 to 15 mils thick with a surface finish 20 to 70 microinches $R_a$. In other embodiments, it may be thicker than 15 mils and vary in surface roughness from 10 to 100 microinches $R_a$.

The physical and electrical properties of the ceramic do not deteriorate over time or due to exposure to oxygen, moisture, or chemicals resulting in a long useful life for the product.

FIG. 3 illustrates a second embodiment in which the ESA roller 31 has only one ceramic layer 42 of semiconductive material formed on a conductive, but non-magnetic, core 41, which is grounded. The core 41 could be made non-conductive and the voltage applied to the semiconductive ceramic layer 42 through a voltage applicator roller. The web 44, doctor blade 45, coating roller 46 and reservoir 47 of coating material are similar to the embodiment illustrated in FIG. 2.

This has been a description of examples of how the invention can be carried out. Those of ordinary skill in the art will recognize that various details may be modified in arriving at other detailed embodiments, and these embodiments will come within the scope of the invention.

While the preferred embodiment of the invention is described with reference to a coating machine, the invention also has utility in printing machines and copying machines.

Therefore, to apprise the public of the scope of the invention and the embodiments covered by the invention, the following claims are made.

We claim:

1. An electrostatically chargeable roller usable in a machine for coating or printing, the roller comprising:

a cylindrical roller core of a fiber-reinforced composite material;

a ceramic semiconductive layer bonded to the cylindrical roller core;

wherein the ceramic semiconductive layer is formed of at least one plasma-sprayed coating of ceramic material the resistance of which is controlled by plasma spraying of the ceramic material on the cylindrical roller core to form a semiconductive ceramic layer; and wherein the electrical resistance of the ceramic semiconductive layer is further controlled by the manner in which the ceramic material is plasma-sprayed.

2. The roller of claim 1, wherein
the core is insulated, and wherein the core is formed of a conductive core and an insulating ceramic layer disposed to cover an outer cylindrical surface of the core.

3. The roller of claim 1, wherein the semiconductive ceramic layer is controlled to produce a resistance of approximately $5 \times 10^9$ ohm-cm.

4. The roller of claim 1, wherein
the semiconductive ceramic layer is formed by plasma spraying a blend of an insulating ceramic powder material and a semiconductive ceramic powder material.

5. The roller of claim 1, wherein the semiconductive ceramic layer has a thickness in a range from 0.010 to 0.015 inches inclusive, and wherein the semiconductive ceramic layer is controlled to produce a resistance of approximately $5 \times 10^9$ ohm-cm.

6. The roller of claim 1, wherein the semiconductive layer is formed to exclude the last inch on each end of the roller to keep coating material away from the electrical connections to the roller.

7. The roller of claim 1, further comprising a relatively more conductive layer disposed between the semiconductive layer and the core, wherein said relatively more conductive layer is at least twenty times lower in resistance than the semiconductive surface layer.

8. (amended) A method for making an electrostatically chargeable roller usable in a machine for coating or printing, the method comprising:

bonding a ceramic layer to a tubular core of fiber-reinforced material;

wherein the ceramic layer is formed by plasma spraying a blend of an insulating ceramic material and a semiconductive ceramic material to form a ceramic layer which is bonded to the roller core, with the ceramic layer having a selected resistance to produce an electrostatic attraction in response an applied voltage differential.

9. The method of claim 8, further characterized in that the plasma spraying step is performed in a number of repetitions to apply successive sublayers which form the ceramic layer.

10. The method of claim 8, further comprising sealing the ceramic layer with a seal coat.

* * * * *

UNITED STATES PATENT AND TRADEMARK OFFICE
CERTIFICATE OF CORRECTION

Patent No.  : 5,609,553

Dated       : March 11, 1997

Inventor    : Bruce E. Hyllberg

It is certified that error appears in the above-identified patent and that said Letters Patent is hereby corrected as shown below:

Column 2, line 51, before "insulating", "a" should be --an--.

Column 2, line 52, before "insulating", "a" should be --an--.

Column 2, line 63, after "response" insert --to--.

Column 3, line 5, "for" should be --is--; after "advantageous", "is" should be --for--.

Column 4, line 40, after "would" insert --be--.

Column 8, line 13, delete "(amended)".

Signed and Sealed this

Fifteenth Day of July, 1997

*Attest:*

BRUCE LEHMAN

*Attesting Officer*  *Commissioner of Patents and Trademarks*